(12) United States Patent
Cservölgyi et al.

(10) Patent No.: US 9,160,175 B2
(45) Date of Patent: Oct. 13, 2015

(54) DISTRIBUTED POWER GENERATION SYSTEM, CONTROL MEANS AND METHOD FOR CONTROLLING THE POWER GENERATION OF THE SYSTEM

(71) Applicant: VPP Energy Zrt., Budapest (HU)

(72) Inventors: Krisztián Cservölgyi, Dunakeszi (HU); Gábor Dicsö, Budapest (HU); Lajos Németh, Budapest (HU); István Gál, Budapest (HU)

(73) Assignee: VPP Energy Zrt., Budapest (HU)

( * ) Notice: Subject to any disclaimer, the term of this patent is extended or adjusted under 35 U.S.C. 154(b) by 431 days.

(21) Appl. No.: 13/761,293

(22) Filed: Feb. 7, 2013

(65) Prior Publication Data

US 2014/0001857 A1 Jan. 2, 2014

Related U.S. Application Data

(60) Provisional application No. 61/643,998, filed on May 8, 2012.

(51) Int. Cl.
*H02J 4/00* (2006.01)
*H02J 3/38* (2006.01)
*H02J 13/00* (2006.01)
*H02J 1/10* (2006.01)

(52) U.S. Cl.
CPC . *H02J 4/00* (2013.01); *H02J 3/381* (2013.01); *H02J 13/0006* (2013.01); *H02J 3/382* (2013.01); *H02J 3/383* (2013.01); *H02J 3/386* (2013.01); *H02J 3/387* (2013.01); *H02J 13/0065* (2013.01); *H02J 13/0075* (2013.01); *Y02E 10/563* (2013.01); *Y02E 10/763* (2013.01); *Y02E 40/72* (2013.01); *Y02E 60/7853* (2013.01); *Y04S 10/12* (2013.01); *Y04S 10/123* (2013.01); *Y04S 40/126* (2013.01); *Y10T 307/50* (2015.04)

(58) Field of Classification Search
USPC .......................................................... 307/43
See application file for complete search history.

(56) References Cited

U.S. PATENT DOCUMENTS

7,778,940 B2   8/2010   Mazzarella

*Primary Examiner* — Robert Deberadinis
(74) *Attorney, Agent, or Firm* — Jason D. Voight (57) ABSTRACT

An apparatus and method for controlling the power generation of a distributed power generation system including a plurality of small power plants. The apparatus has a first communication interface unit to receive measured values of the instantaneous power generated by the small power plants, and to transmit to each of the small power plants, information relating to the individual power control thereof. A second communication interface unit receives, from a production control center, power values specified as a function of the instantaneous load of the power supply system. A central data processing unit determines the aggregate instantaneous power of the distributed power generation system based on the measured power values, determines the difference between the power specified by the production control center and the aggregate instantaneous power of the system, and generates power control information for each of said small power plants as a function of said power difference.

15 Claims, 6 Drawing Sheets

DISTRIBUTED POWER GENERATION SYSTEM, CONTROL MEANS AND METHOD FOR CONTROLLING THE POWER GENERATION OF THE SYSTEM

This application claims priority to U.S. provisional application Ser. No. 61/643,998, filed May 8, 2012, the entire disclosure of which is hereby incorporated by reference herein.

The present invention relates to a distributed power generation system, a control means and a method for controlling the power generation in the system.

The electrical energy cannot be stored on an industrial scale at all, or it can be stored only uneconomically. Although in the field of research and development, the to efforts to make storage of electrical energy economical on the industrial scale can be continuously noticed, such efforts have not led to a success up to now. Currently, the only solution for economically storing a high amount of electrical energy for a long time seems to be the use of so-called pumped-storage power plants, in which the surplus volume of the electrical energy over the volume fed into a power distribution system to cover the consumption demands, i.e. the excess power, is used to increase the potential energy of the water body, wherein the energy is recovered on demand by means of hydraulic turbines. This solution, however, can be utilized economically only in areas with appropriate natural resources (within Europe in Austria, for example), while the initial costs of such projects are extremely high.

Due to the above reasons, the electrical energy is generally produced according to the actual consumption demands in a controlled manner. In nation-wide or regional electrical power supply systems, high-performance power plants, so-called large power plants are primarily used in real-time, closed-loop production control processes centrally managed by a production control center (a so-called system controller). In Europe, the production control is provided by a multiple level control system, wherein beyond a control process allowing a very quick regulation (with a regulation time of typically a few seconds), another regulation with somewhat longer regulation time (typically a few minutes), i.e. a so-called secondary regulation, also plays a key role. The aim of the secondary regulation is to adjust the power balance between the production and the consumption in a power supply system to a specific value. Although in the regulation of the instantaneous power of an electric power supply system, in addition to the large power plants participating in the nation-wide or regional electrical power generation, other power plants with substantially less (even to an extent of several orders) nominal power, the so-called small power plants, have also been recently involved, those can currently be started or stopped only individually and eventually according to a request and permission of the production control center, at previously agreed times, just for safely follow the bigger changes in the instantaneous energy consumption. This operation is provided on a so-called tertiary regulation level, wherein the capability of power control at a secondary level should be guaranteed generally within 15 minutes.

Since generally, the combined energetic efficiency of large power plants is substantially lower than the combined energetic efficiency of small power plants performing switched power production, i.e. those small power plants that in addition to the electrical energy, also generate heat (as loss), the specific operational cost of the large power plants is higher, and due to the lower combined energetic efficiency, the large power plants provide a higher specific environmental load as compared to that of the small power plants.

The small power plants do not, or only in a very limited number, take part in the secondary level regulation of the currently known nation-wide or regional electrical power supply systems, because in a secondary level regulation, the individual participation of a small power plant is a very costly and of low efficiency because of the currently applied technical conditions and operational requirements. One of the reasons of these facts is that every power plant, also including the small power plants, that take part in the secondary level regulation, shall provide a direct, secure and closed data transmission connection to the production control center, the implementation of which is, however, economical only above a certain production volume. Furthermore, the availability of the small power plants are usually substantially lower than the availability of the large power plants, which in most cases makes the individual participation of the small power plants uneconomical in the secondary level regulation.

In addition to the above facts, the small power plants are not suitable for individually participating in the secondary level regulation of a nation-wide or regional electrical power supply systems also for the reason that their nominal power and therefore their eventually available free capacity are generally substantially lower (and in most cases negligible) as compared to the system level power range of control required by the production control center.

It is a further problem from the point of view of the small power plants that availability of an average small power plant, which is typically about 95%, is unacceptably low for a nation-wide or regional electrical power supply system, which requires an availability of approximately 100% for those power plants being involved in the secondary level regulation.

The involvement of the individual small power plants in the secondary level control is difficult also for the reason that due to its low operational power, a common small power plant can provide a power changing rate (power gradient) that is substantially lower than those values expected at a system level.

For example, the document WO 2003/007120 A2 partly addresses to avoid the above mentioned drawbacks. This document discloses a system and a method for operating distributed electrical power generation systems.

The above referenced document describes a method comprising the steps of receiving and storing data relating to the operating performance of a plurality of local power production units; receiving and storing data relating to the local power consumption for the plurality of local power production units; determining the available aggregate quantity of excess power generation capacity for the plurality of local power production units based upon the operating performance data and the power consumption data; communicating to at least one power purchasing entity an offer to sell at least part of the available aggregate quantity of excess power generation capacity of the plurality of local power production units; receiving from at least one power purchasing entity an order to purchase a quantity of excess power generated by the local power production units; communicating with the plurality of local power production units to provide each local power production unit with instructions regarding the quantity of power to be produced by that unit; and receiving and storing data relating to the quantity of power transmitted to at least one power purchasing entity by each local power production unit. The system disclosed in this document comprises means for performing steps of the aforementioned method.

A basic deficiency of the above solution is that it does not provide a system-level, closed-loop production control by using local power plants, but it purely provides a business method for local power plants to allow them to sell their excess production capacities on the energy market. Since the electrical energy trade works on an invoicing basis of a quarter hour or one hour, the local power plants can feed their excess power beyond the local consumption demands into a nation-wide or regional electrical power distribution network by using a schedule of a quarter hour or one hour, by taking their actual excess production capacity into view, which means that these local power plants cannot therefore take part in the secondary level regulation of the nation-wide or regional electrical power supply system, as at the secondary control level, the correction time cannot exceed a few seconds, and a new reference value specified by the production control center should be reached within a few minutes.

Another disadvantage of the above solution is that as it provides a commercial sale method, it may occur that the excess production capacities offered by the local power plants cannot be sold or can be only partly sold to the energy buyers, therefore it cannot be guaranteed that an increase in the production corresponding to the actual, increased demands is immediately started, for example, because of communication and/or business decision delays due to possible price negotiations, which may lead to a disturbance of the power supply system.

There is still a need for providing a power generation system that allows to economically involve small power plants primarily satisfying local demands into a secondary level control of a nation-wide or regional electrical power supply system, wherein as a part of a distributed power generation system, the small power plants are capable of feeding a certain portion of their free capacity continuously and in a controlled manner into the nation-wide or regional power distribution network as a function of the actual load of the power supply system.

It is therefore an object of the present invention to provide a method and an apparatus, as well as a system for carrying out the method, that can avoid the drawbacks of the prior art solutions and that allow the small power plants to use their excess production capacities economically in the controlled production of a nation-wide or regional power supply system.

Another object of the present invention is to provide a system, an apparatus and a method that by means of coordinated power control of the small power plants, can be carried out economically even with unforeseen consumption input data, and wherein by using a distributed power generation system including the small power plants, a very high power changing rate and extremely high availability of approximately 100% can be reached, while the small power plants also take part in the power control of a nation-wide or regional power supply system.

These and other objects are achieved by providing an apparatus for controlling the power generation of a distributed power generation system including a plurality of small power plants, the apparatus comprising:

a first communication interface unit configured to receive, from each of the small power plants via a first communication interconnection, measured values of the instantaneous power generated by the small power plants in the distributed power generation system, and to transmit, through said first communication interconnection to each of the small power plants, information relating to the individual power control of the small power plants, a second communication interface unit configured to receive, from a production control center via a second communication interconnection, power values to be provided by the distributed power generation system for said power supply system, said power values being specified by said production control system as a function of the instantaneous load of the power supply system managed by said production control system, and a central data processing unit configured to determine the aggregate instantaneous power of the distributed power generation system on the basis of the measured power values received from the small power plants, to determine the difference between the power specified by the production control center for the distributed power generation system and the aggregate instantaneous power of the distributed power generation system, and to generate power control information for each of said small power plants as a function of said power difference, according to a predetermined method.

The above object are further achieved by providing a distributed power generation system including a plurality of small power plants, each of said small power plants comprising one or more power generation units, at least one power measurement unit, a power plant control unit, a communication network interface unit and a switching unit for coupling to a power distribution network. The system is characterized by that the system further comprises a central control apparatus as described above, and a communication network for providing communication interconnections between the aforementioned control apparatus and each of the small power plants.

Finally, the above objects are also achieved by providing a method of controlling the power generation of a distributed power generation system including a plurality of small power plants, wherein said distributed power generation system produces power for a power supply system managed by a production control center, the method comprising the steps of:

receiving measurement data relating to instantaneous power generated by the small power plants for the distributed power generation system, and determining from said measurement data an aggregate instantaneous power of the distributed power generation system, from said production control center, receiving, at predetermined intervals, a plurality of control reference signal values specifying the power to be produced by the distributed power generation system for said power supply system as a function of the instantaneous load in the power supply system managed by said production control center, determining a difference between the power specified by said production control center for the distributed power generation system and the aggregate instantaneous power of the distributed power generation system, and individually controlling the power of each small power plant within a predetermined time limit so that if the power specified for the distributed power generation system is greater than the aggregate instantaneous power of the distributed power generation system, then instructing at least one small power plant selected from the small power plants having free capacity to increase its power, if the power specified for the distributed power generation system is equal to the aggregate instantaneous power of the distributed power generation system, then keeping the aggregate power of the distributed power generation system unchanged, and if the power specified for the distributed power generation system is smaller than the aggregate instantaneous power of the distributed power generation system, then instructing at least one small power plant selected from said plurality of small power plants to decrease its power.

Beyond the fact that by means of the present invention, the small power plants producing power locally can be economically involved in the power control of, for example, a nation-wide or regional power supply system, the system and the method according to the invention have the further advantage that they allow to efficiently integrate those small power plants that exclusively produce power for the distributed power generation system according to the invention.

Yet another advantage of the present invention is that it allows a coordinated production control of the switched small power plants while maximizing their combined energetic efficiency.

Yet another noteworthy advantage of the system and method according to the present invention is that in addition to the more economical operation of the small power plants, higher energy prices can be achieved in the energy market for those small power plants participating in the nation-wide or regional, system-level controlled power generation, while keeping the possibility for them to sell their possible further excess capacities in a conventional manner in other segments of the energy market, such as in the online commercial system introduced in the above mentioned WO document.

The present invention will now be described in more detail through its preferred embodiments with reference to the accompanying drawings, in which FIG. 1.a is a schematic interconnection diagram of the control circuit of the distributed power generation system in accordance with the invention, FIG. 1.b is a time diagram of the control process of the distributed power generation system according to the invention, FIGS. 2.a and 2.b schematically illustrate the block diagrams of known preferred embodiments of a small power plant applied in the distributed power generation system in accordance with the invention, FIGS. 3.a and 3.b are functional block diagrams of the control apparatus according to various embodiments of the present invention, FIG. 4.a depicts a functional block diagram of the distributed power generation system in accordance with the invention, FIG. 4.b is a functional block diagram of a preferred embodiment of the distributed power generation system in accordance with the invention.

Figure 1:
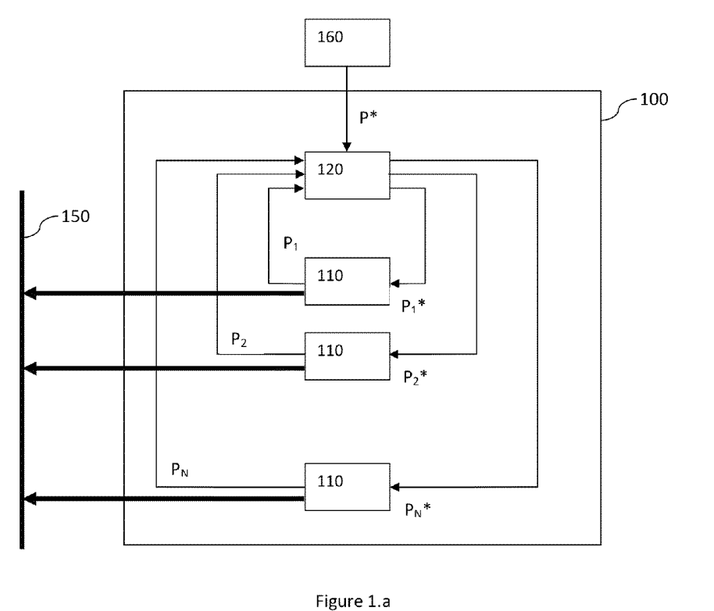

FIG. 1.a schematically illustrates a connectivity diagram of the control circuit of the distributed power generation system 100 according to the invention. The distributed power generation system 100 includes a plurality of small power plants 110 and a central control apparatus 120.

Within the meaning of the present invention, the small power plants 110 are power generation units capable of feeding power into a power distribution network 150 of said power supply system, wherein the power of the small power plants are substantially lower, even to an extent of several orders, as compared to the power control range of the power supply system served by the distributed power generation system 100 according to the invention, said power supply system including a plurality of power plants. In the case where the distributed power generation system according to the invention produces power, for example, for a nation-wide or regional power supply system, the small power plants 110 should be understood as small power plants that are capable of feeding power into said nation-wide or regional power supply system 150, the power of the small power plants generally being substantially lower than the power produced by the high-performance power plants (the so-called large power plants) used in said nation-wide or regional power supply system and also much lower than the power control range of such power supply system.

A small power plants 110 applied in the distributed power generation system 100 according to the invention is primarily, but not exclusively, a local small power plant that provides a private power supply for industrial or other establishments operating in a narrower vicinity of said small power plant, or provides energy supply for local consumers. Within the context of the present invention, a small power plant 110 may even be a small power plant that generates power exclusively for the distributed power generation system 100 according to the invention, and it can even be a large power plant that utilizes a certain portion of its excess capacity within the distributed power generation system 100 according to the invention, said excess capacity being a minor portion of its production capacity. The small power plants 110 may include, for example, fuel cell power plants, gas engine power plants, wind power plants, hydro power plants, biogas power plants, solar collector or solar cell power plants, etc. The small power plants 110 are typically, but not exclusively, power plants that produce electrical energy by using some kind of fuel (e.g. fossil fuel, natural gas, biomass, etc.) or regenerative energy sources (for example, wind energy, solar energy, hydro energy, etc.). Preferably, the small power plants 110 are adapted to locally utilize the waste heat generated as a by-product during the electrical power generation, thereby their combined energetic efficiency will increase.

Each of the N pieces of the small power plants 110 belonging to the distributed power generation system 100 feeds a power $P_i$ into said power distribution network 150, such as a nation-wide or regional power distribution network, that is the distributed power generation system 100 according to the invention feeds an aggregated power $P_{vpp}(t)=\Box P_i(t)$ of the small power plants 110 into the power distribution network 150. As the aggregate power $P_{vpp}$ becomes commensurable to the power control range of a power supply system to which the small power plants 110 are connected, the distributed power generation system 100 according to the invention as a whole will appear for said power supply system as a single so-called virtual power plant (VPP) and becomes suitable for an economic participation in the system-level power control of said power supply system.

As shown in FIG. 1.a, the distributed power generation system 100 comprises a control apparatus 120 providing the central data processing and performing control functions, wherein said control apparatus 120 receives a single control reference signal from a production control center 160 managing the power supply system served by the distributed power generation system 100. The control reference signal is received by the control apparatus 120 at predetermined intervals, for example at intervals of one second. This control reference signal is used to determine the power $P^*(t)$ to be provided by the distributed power generation system 100 for said power supply system as a function of the continuously changing and time-dependent power consumption in the power supply system. The control reference signal relating to the power demand may be a power signal specified for the distributed power generation system 100, or it may be a frequency signal as well. In the latter case, the power to be provided by the distributed power generation system 100 can be determined as a function of frequency by using computing methods well known for those skilled in the art. The distributed power generation system 100 carries out a dependent control with respect to the power $P^*$ specified either directly or indirectly for it, wherein the controlled signal is the sum of the individual powers $P_i$ fed by each of the small power plants 110 of the distributed power generation system 100 into the power distribution network 150, said sum of the individual powers resulting in an aggregate power $P_{vpp}$ of the distributed power generation system 100. A primary aim of the distributed power generation system 100 is to minimize, within the shortest possible period (generally with a correction time of at most a few minutes), the control error $\Delta P$, which is the difference of the reference signal (P*) and the measured (input) value of the controlled signal ($P_{vpp}=\Box P_i$), that is $\Delta P=P^*-P_{vpp}$.

For a faster and more precise dependent control in the distributed power generation system 100, the central control apparatus 120 continuously (or at predetermined time intervals) determines the power $P_i^*$ to be generated by each of the small power plants 110 using a predetermined algorithm on the basis of the control error ($\Delta P$), and than within a predetermined time limit (typically within at most a few seconds), it instructs at least a portion of the small power plants 110 (or all of to the small power plants 110 if necessary) to increase or decrease the production to achieve the power $P_i^*$ specified for each small power plant 110. The small power plants 110 will modify their production until reaching the power $P_i^*$ specified for them by the central control apparatus 120, unless in the meantime they receive a new instruction to keep the production at a certain level or to change it in the opposite direction.

FIG. 1.b schematically illustrates a control timing diagram for a preferred embodiment of the distributed power generation system 100 according to the present invention, wherein the curve indicated by A depicts the change in the power reference signal P* specified by the production control center 160, the curve indicated by B depicts the change in the aggregate power $P_{vpp}$ fed by the overall distributed power generation system 100 into the power distribution network 150, whereas the curve indicated by C depicts the time-dependant change in the power $P_i$ fed by one of the small power plants 110 into the power distribution network 150. In the time diagram it is clearly shown that the aggregate power $P_{vpp}$ of the entire system is capable of quickly following the reference power P* with high precision. The higher number of small power plant 110 takes part in the controlled and distributed power generation, the higher power changing rate (power gradient) can be achieved in the distributed power generation system 100 according to the invention, that is, the shorter correction time is needed to follow the reference signal specified by the production control center 160.

Figure 2:
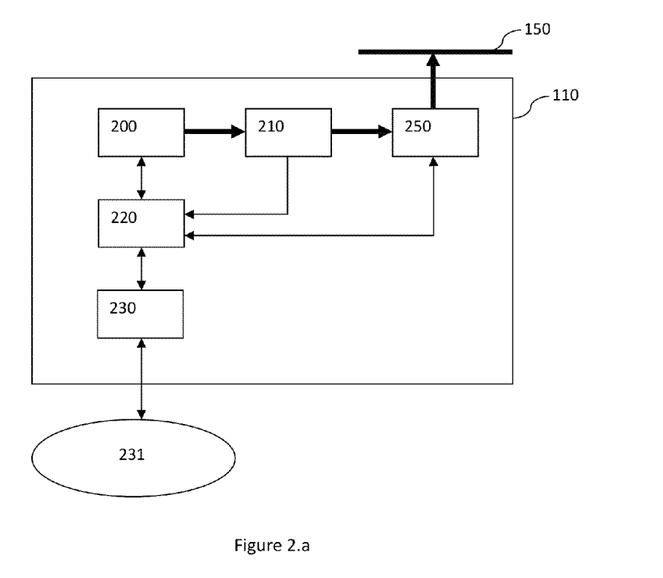

FIGS. 2.a and 2.b illustrate some examples of the arrangement, well known in itself, of the small power plants 110 used in the distributed power generation system 100 according to the invention. Each of the small power plants 110 comprises one or more energy production unit 200, at least one power measurement unit 210, a power plant control unit 220, a communication network interface unit 230 and a switching unit 250 for coupling the small power plant to the power distribution network 150. For example, the small power plant 110 shown in FIG. 2.a has only one energy production unit 200, whereas the small power plant 110 shown in FIG. 2.b operates two energy production units 200, the aggregate power of which gives the output power of the small power plant 110.

The energy production unit 200 alters the energy of the fuel fed into it or the regenerative energy used by it mainly into electrical energy, and partly into heat energy (that is generally meaning a loss).

The power measurement unit 210 is used to measure the power fed into the power distribution network 150 by the small power plant 110. In case a small power plant 110 produces power not only for the distributed power generation system 100, but, for example, it also generates power for satisfying local consumption needs, such as the small power plant 110 shown in FIG. 2.b, the small power plant 110 further comprises one or more additional power measurement unit 212 for measuring the power of the local production. The small power plant 110 may also comprise measurement units for measuring other operational parameters (e.g. temperature, pressure, fuel consumption, etc.) that are not shown in the drawings for the sake of simplicity.

The power plant control unit 220, which is preferably a processor device, receives the measurement data of the power measurement unit 210 (and optionally, the measurement data of additional power measurement units 212 or other operational parameter measurement units), stores and processes the measurement data and in response to the processed measurement data, it controls the operation of energy production unit(s) 200 in a pre-programmed manner. For managing the control tasks and possible manual intervention, the power plant control unit 220 may be equipped with an input device (e.g. keyboard), a display unit (e.g. screen) and optionally with special control switches (e.g. for emergency shut-down, programmed start-up, etc.).

The communication network interface unit 230 is used to establish data transmission interconnection between the power plant control unit 220 and the central control apparatus 120 through a communication network. The power plant control unit 220 of the small power plant 110 sends, through the communication network interface unit 230 to the control apparatus 120, measurement data for operating the distributed power generation system 100, in particular power data measured by the power measurement unit 210 and optionally, the local output power of the small power plant 110, as well as measured data of other operational parameters, and it receives, from the central control apparatus 120, control information relating to the production of the small power plant 110.

The small power plants 110 input the energy produced for the distributed power generation system 100 through the switching unit 250 into the power distribution network 150. The switching unit 250 is controlled by the power plant control unit 220 in response to the control information received from the central control apparatus 120. The switching unit 250 comprises mechanical, electrical and electronic devices, each being well known in itself, for safely and technically appropriately coupling of the one or more energy production unit 200 of the small power plant 110 to the power distribution network 150. The power fed through the switching unit 250 into the power distribution network 150 is measured by the power measurement unit 210.

Figure 3:
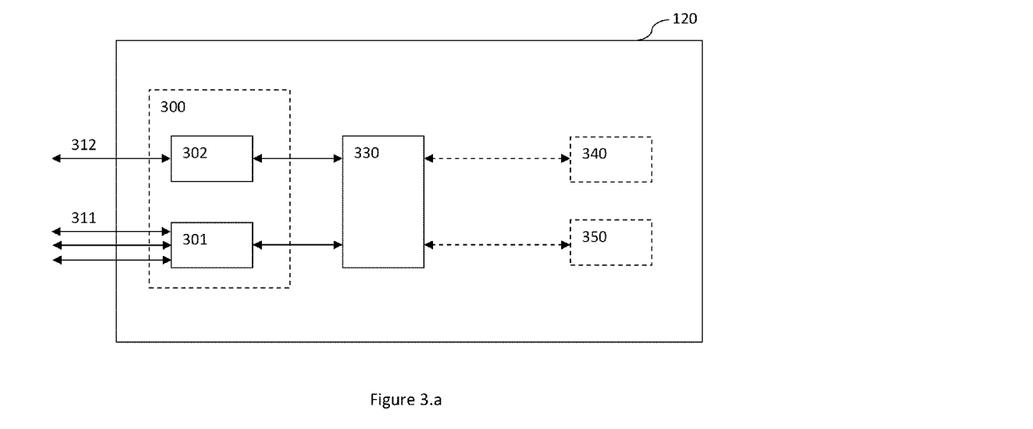

FIG. 3.a illustrates a functional block diagram of various preferred embodiments of the control apparatus used in the distributed power generation system according to the present invention.

The control apparatus 120 comprises a first communication interface unit 301 that is used by the control apparatus 120 to receive, from each of the small power plants 110, the measured values of the instantaneous power produced by the small power plants 110 for the distributed power generation system according to the invention, through a first communication interconnection 311, while sending, through said first communication interconnection 311, information relating to the individual power control of the small power plants 110 to each of them.

The control apparatus 120 further comprises a second communication interface unit 302 for receiving, from the production control center 160 through a second communication interconnection 312, the specified values of the control reference signal determining the power to be provided by the distributed power generation system according to the invention for the aforementioned power supply system as a function of the instantaneous power consumption in the power supply system managed by the production control center 160. The communication interconnection 312 may apply electrical, electromagnetic or optical signal transmission, or any combination thereof.

In a preferred embodiment of the control apparatus 120 according to the invention, the first and second communication interface units 301, 302 may be carried out as a single integrated communication unit 300 indicated by a dashed line in FIG. 3.a.

The control apparatus 120 further comprises a central data processing unit 330, preferably with one or more processor, for determining the instantaneous aggregate power ($P_{vpp}$) of the distributed power generation system of the invention on the basis of the measured power values ($P_i$) received from the small power plants 110, for determining the power difference ($\Delta P$) between the power ($P^*$) specified by the production control center 160 for the distributed power generation system and the aggregate instantaneous power ($P_{vpp}$) of the distributed power generation system, and for generating specific power control information for each of the small power plants 110 as a function of said power difference, according to a predetermined algorithm. The central data processing unit 330 is electronically connected to the communication interface units 301, 302.

In a preferred embodiment of the control apparatus 120 according to the invention, as shown in FIG. 3.b, the display unit 340 and the input device 350 may be arranged remotely from the central data processing unit 330, and the central data processing unit 330 may communicate therewith through a communication interconnection 314 by means of a communication interface 304 electronically coupled to said central data processing unit 330. A communication interconnection 314 may, for example, be implemented via the internet. In this case, the central data processing unit 330 and the communication interface units 301, 302, 304 may be arranged, for example, in a secure server park 120a, whereas the display unit 340 and the input device 350 (together with their associated communication interface units) may be arranged, for example, in a dispatcher center 120b. The communication interconnection 314 may apply electrical, electromagnetic or optical signal transmission or any combination thereof.

Figure 4:
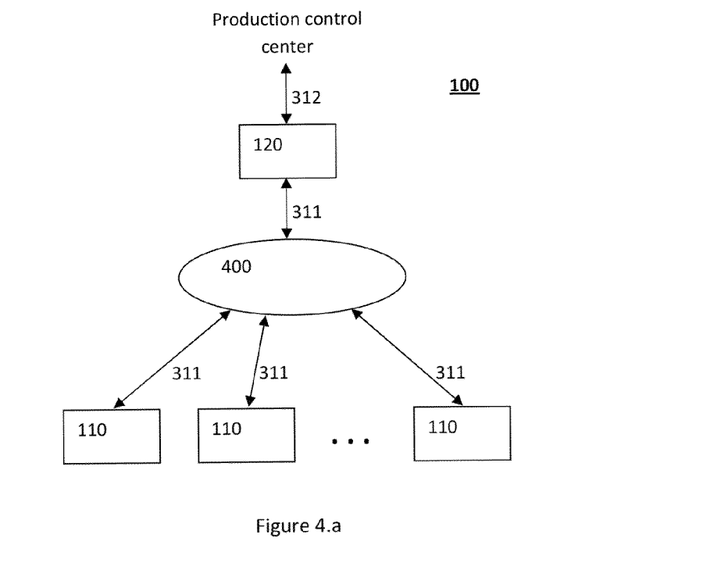

FIG. 4.a illustrates a functional block diagram of the distributed power generation system according to the present invention. The distributed power generation system 100 includes a plurality of small power plants 110, the structure of which has been described above with reference to FIGS. 2.a and 2.b. The distributed power generation system 100 further comprises a central control apparatus 120, also described above with reference to FIGS. 3.a and 3.b, which receives, from the production control center 160 of a power supply system, a time-dependant control reference signal as a function of the actual energy consumption in order to take part in the power control process of said power supply system. The data transmission interconnections between the central control apparatus 120 and the small power plants 110 (i.e. the communication interconnections 311 shown in FIGS. 3.a and 3.b) are provided by a communication network 400. The communication network 400 may include shared or dedicated communication media, and physical or virtual lines. The communication may be carried out by means of wired signal transmission (e.g. electrical or optical transmission) or wireless signal transmission (e.g. radio, microwave or satellite transmission), or any combination thereof. In a preferred embodiment of the distributed power generation system 100 according to the invention, the communication network 400 is provided by the Internet, which offers a comparatively low-cost solution. For achieving enhanced data security and for providing real-time digital control, it is preferred that the communication network 400 is in the form of a virtual private network (VPN) using the Internet. However, in view of the fact that in the distributed power generation system 100 according to the invention, the small power plants 110 and the central control apparatus 120 are arranged at geographically different locations, in many cases at large distances (even several hundreds or thousands kilometers) from each other, one of the key issues of the real-time control of the small power plants 110 is the reliability of the communication within the system.

Although according to our practical experiences, despite the low operational cost the data communication over the Internet provides a data communication with satisfactory quality, in another embodiment of the distributed power generation system 100, the communication network 400 includes dedicated data transmission lines, in particular leased telephone lines or microwave (e.g. GSM) data transmission lines between the control apparatus 120 and the small power plants 110 to achieve an even higher reliability of communication. The reliability of the communication may be further enhanced by doubling each of the data transmission interconnections, or even more data transmission systems of different technologies may also be simultaneously established between the control apparatus 120 and the small power plants 110, wherein one of the technologies may be used for a primary (normal operational) communication, whereas the additional data transmission technologies may serve as back-up resources for those situations when the primary data transmission system fails and becomes partly or entirely inoperable.

FIG. 4 illustrates a system-level arrangement of an embodiment of the distributed power generation system according to the invention, said embodiment being particularly preferred in a practical aspect.

This system includes several small power plants 110, only one of which is shown in FIG. 4.b for the sake of simplicity. The small power plant 110 comprises a power measurement unit 210 for measuring electrical power, as well as additional measurement units 419 for measuring, for example, the amount of gas used for power generation and the volume of the heat locally sold. The signals of the power measurement unit 210 and the measurement units 419 are received by a power plant measurement system 418 (VPP-PMMS) which forwards the signals to the power plant control unit 220 (VPP-PMCU) used to generate appropriate control signals for the generator control unit 415 (GCU). The generator control unit 415 is supervised by a local operator by means of an OPC server 414. Operation of the small power plant 110 can also be remotely supervised by means of a remote access unit 410 (VPP-RA-PLANT).

In this case, the units of the control apparatus 120 are arranged in a server park 120a and in a dispatcher station 120b (VPP-DS) locating remotely therefrom. In the server park 120a, for example, a central measurement data processing server (VPP-CMS) and a central control server (VPP-CCS I.) can provide the various functions of the central data processing unit. It is preferred that the units operating in the server park 120a are connected to the small power plants 110 via the Internet 401, and they communicate to the production control center 160 through closed secure data transmission lines. For security reasons, the central control server operating in the server park 120a is doubled and the system includes another central control server (VPP-CS II.) with the same functions in another server park 120c, which, similarly to the server park 120a, is capable of communicating with the small power plants 110 and the production control center 160.

The display unit 340 and the input device 350 are arranged in the dispatcher station 120b which in this case, preferably communicates through the Internet 401 with the units of the server park 120a. Preferably, the dispatcher station 120b further includes a reporting server 416 (VPP-RS) that prepares reports about the system and forwards them to the production control center 160 or other destinations through the Internet 401. The dispatcher station 120b may also comprise other modules 417 for providing functions in relation with the operation of the system, for example for the purpose of trade, operation, maintenance, finance or controlling. Both of the server park 120a and the dispatcher station 120b may be remotely controlled by means of remote access units 411 (VPP-RA-MANAGER).

A particularly beneficial feature of the distributed power generation system according to the invention is that it is arbitrarily scalable, meaning that a theoretically unlimited number of small power plants can be integrated in it. In this respect, a practical limit could only be the throughput of the communication network between to the central control apparatus and the small power plants.

Figure 5:
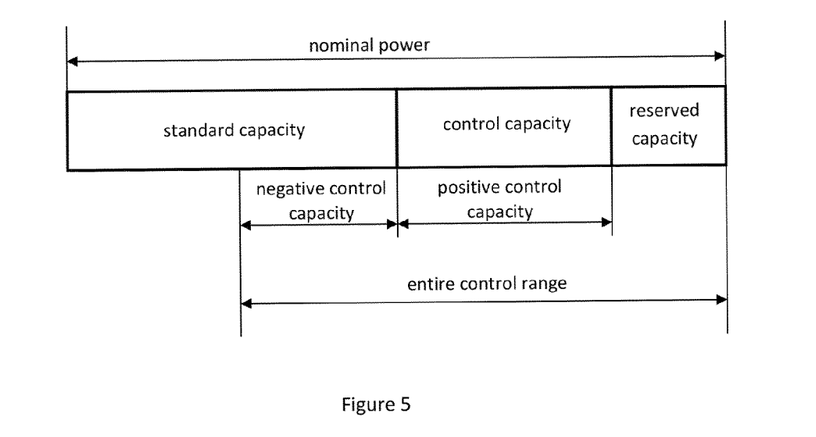
FIG. 5 schematically illustrates the division of the total capacity of the distributed power generation system in accordance with the invention.

FIG. 5 schematically illustrates the division of the capacity of the distributed power generation system according to the invention. The total capacity of the system is the sum of the free capacities of the individual small power plants, wherein said free capacities are available for use in the distributed power generation system. For those small power plants operating exclusively for the distributed power generation system of the invention, their free capacity is their nominal power, whereas for a small power plant that also takes part in a local (or other) power production, the free capacity is a predetermined portion of its unused capacity.

A portion of the total capacity of the distributed power generation system according to the invention is the so-called production capacity, whereas the remaining portion of the total capacity serves as a reserved capacity for scheduled replacement of the production capacity in a period of shut-down of one or more small power plant, for example in case of a pre-planned maintenance. The reserved capacity also allows an internal power equalization within the system (that is the substitution of the missing production capacity) when one or more small power plant that normally takes part in the production brakes down unexpectedly. Hence, when the above mentioned events occur, the reserved capacity can be partly or entirely altered into a production capacity.

The reserved capacity is preferably provided by small power plants that are out-of-work but kept in stand-by mode, and/or small power plants with substantial amount of excess production capacities. In case of an appropriately sized reserved capacity, the distributed power generation system according to the invention can provide approximately 100% availability, which is far beyond the typically ca. 95% availability of a stand-alone small power plant. This feature makes the distributed power generation system according to the invention suitable for the integration into a real-time, closed-loop power control of, for example, a nation-wide or regional power supply system.

A portion of the production capacity is the so-called standard production capacity, which is provided by the production of the switched small power plant (i.e. the small power plants feeding power into the power distribution network at a given time) according to a previously determined normal (daily) time-schedule, which is generally prepared one day before a day D of the production, i.e. on day D−1, said time-schedule being typically programmed on a quarter-hour basis or sometimes a one-hour basis. The remaining portion of the production capacity is a positive control capacity that can be used for increasing the production. The maximum value of the power difference in the negative direction from the standard capacity (belonging to the time-scheduled production) is defined as a negative control capacity, the value of which cannot obviously exceed the value of the standard production capacity. The distributed power generation system according to the invention carries out a real-time dependent control within the aforementioned positive and negative control ranges as a function of the time-dependent control reference signal specified by the production control center. In this respect, the above mentioned reserved capacity should also be regarded as a kind of control capacity since during its use, it also provides a control function in the production (i.e. equalizing power generation).

The normal daily time-schedule of the small power plants (i.e. the standard production capacity of the distributed power generation system according to the invention) is thus allocated by the central control device in real time for the individual small power plants by taking their nominal power and optionally, the normal time-schedule of their local (or other) production into account.

The time-schedule of the control capacity (including both of the production and the reserved capacities) is not known in advance and it has been established on the basis of the production control instructions provided by the central control apparatus of the distributed power generation system according to the invention. The positive control capacity is used when the standard production capacity is not enough for producing the power specified by the production control center, i.e. at ascending control, whereas the negative control capacity is used when the power requirement is lower than the power specified by the time-schedule. The positive and negative control capacities may have different values.

A significant feature, being novel over the prior art, of the distributed power generation system according to the invention is that the energy selling process is independent of the production, and invoicing of the quantity of energy fed into the power distribution network by the distributed power generation system through the switched small power plants will be performed posteriorly, typically on the day D+1, on the basis of previously agreed tariffs. The pre-ordered amount of energy produced according to the normal time-schedule (i.e. the standard production capacity) is normally invoiced at a lower price, whereas the energy produced by utilizing the positive control capacity is invoiced at a higher price. Due to the fact that invoicing is carried out posteriorly, on the basis of the measured amounts of power, the commercial step of making an agreement between the selling prices of the free capacities offered by the small power plants and the purchase prices considered acceptable by the energy buyers may be avoided, and a real-time, controlled and high-precision adaption to the consumption demands becomes available, which was not feasible in the distributed power generation systems of the prior art because in those solutions, the extra production could be carried out only after the sale of energy and with relatively substantial delay, up to the extent of the purchased amount of energy.

Figure 6:
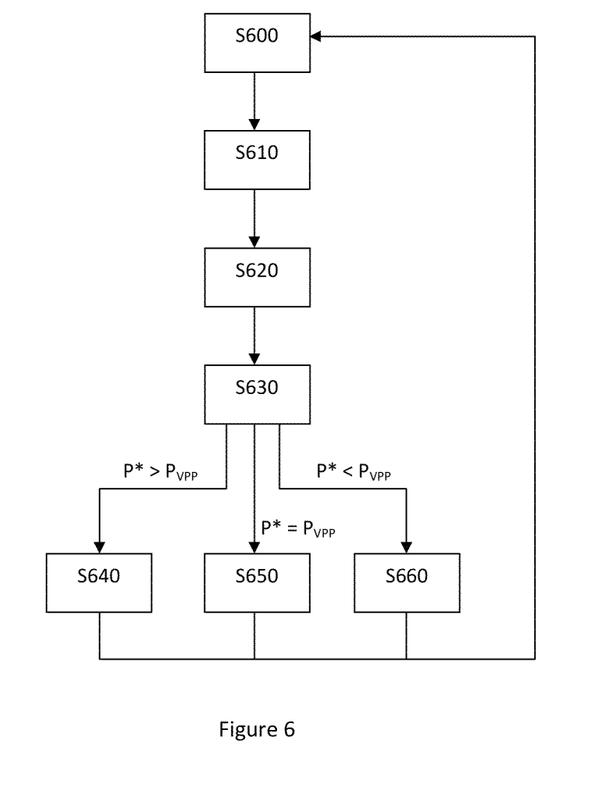
FIG. 6 illustrates the major steps of the method according to the invention.

FIG. 6 illustrates a flow diagram of the major steps of the method of controlling the power production of the distributed power generation system having a plurality of small power plants, in accordance with the present invention. In the method according to the invention, the power is produced by means of the distributed power generation system for a power supply system, for example a nation-wide or regional power supply system, the operation of which is managed by a production control center. Said power supply system may also comprise other power generation units that may include high-performance power plants, as well as additional distributed power generation systems. The power produced by the small power plants of the distributed power generation system for said power supply system is directly fed into the power distribution network of said power supply system. Preferably, the small power plants are connected to the power distribution network at or near the location of production.

In a first step S600 of the method, the measurement data relating to the instantaneous power ($P_i$) produced by the small power plants in the distributed power generation system are received. In a preferred embodiment of the method, the measurement data may also include the measured values of other operational parameters, for example the power output for a possible local (or other) production, fuel consumption, operational pressure and temperature values, etc.

In a next step S610, an aggregate instantaneous power ($P_{vpp}$) of the distributed power generation system is determined from the measurement data received from the small power plants.

In step S620, a control reference signal is received from the production control center of the power supply system as a function of the actual consumption in the power supply system, said control reference signal determining the power (P*) to be provided by the distributed power generation system for said power supply system. The control reference signal is received at predetermined intervals $\Delta T$, preferably at intervals of at most 1 minute, more preferably at intervals of at most 1 second.

In a next step S630, a differential power ($\Delta P$) between the power (P*) directly or indirectly specified by the production control center for the distributed power generation system and the aggregate instantaneous power ($P_{vpp}$) of the distributed power generation system is determined, and then the individual power of each small power plant is controlled within a predetermined time limit $\Delta t$ in the following way.

If the power specified for the distributed power generation system is greater than the aggregate instantaneous power of the distributed power generation system, that is $P^*>P_{vpp}$, then in step S640, at least one of the small power plants that have free capacity will be selected, and the selected small power plants will be instructed to increase their power. It is preferred that the number of the selected small power plants depends primarily on the magnitude of the control error $\Delta P$. When the control error $\Delta P$ is so small that it can be compensated economically even by increasing the power of a single small power plant, then it may be enough to instruct only one small power plant with appropriate free capacity to increase its production. However, if the control error $\Delta P$ is large, several small power plants, or if necessary, even all of the small power plants having free capacity, may be instructed to increase the production to provide the required excess power.

In an alternative embodiment of the method according to the invention, when the power of the distributed power generation system is increased, in step S640, the power of all small power plants having free capacity will be increased independently of the magnitude of the control error $\Delta P$, thereby the power changing rates of the small power plants will be aggregated, which allows an even faster control.

In a preferred embodiment of the method, in step S640, the power of the at least one small power plant selected to increase the power of the overall system will be increased at the highest possible power changing rate, thereby with respect to the group of the selected small power plants, the power changing rate can be maximized. Regarding the overall distributed power generation system, the fastest ascending control can be achieved when the production of all of the small power plants having free capacity is increased at the maximum power changing rate.

If the power specified for the distributed power generation system is equal to the aggregate instantaneous power of the distributed power generation system, that is $P^*=P_{vpp}$, then in step S650, the aggregate power of the distributed power generation system is not modified.

If the power specified for the distributed power generation system is smaller than the aggregate instantaneous power of the distributed power generation system, that is $P^*<P_{vpp}$, then in step S660, at least one of the small power plants will be selected and said at least one selected small power plant will be instructed to decrease its individual power.

In an alternative embodiment of the method, in step S660, all of the small power plants are instructed to decrease the power production, thereby a faster decrease of the power can be achieved. In a preferred embodiment of the method, in step S660, the power of the at least one small power plant, or if necessary, all of the small power plants, that are selected to decrease their power, is decreased at the highest possible power changing rate for the fastest possible control. Optionally, for example at a substantial amount of control error, one or more small power plant that produces exclusively for the distributed power generation system may even be shut down immediately, provided that their re-start within a short period is not expected to be necessary.

The above described steps S600-S660 of the method according to the invention is repeated at predetermined intervals. Precision of the control may be increased by setting the repetition interval of the aforementioned method steps shorter than the receiving period $\Delta T$ of the power reference signal, i.e. when the differences between the power values specified for the distributed power generation system and the measured power values are determined at a frequency higher than the receiving frequency of the reference signal. This results in a reduction of the average control error. When the distributed power generation system according to the invention is provided with substantial control reserves, it is not absolutely necessary to process the data at the receiving period $\Delta T$ of the reference signal, and a longer period may also be appreciated or the data processing may even be triggered by an event when the change in the reference signal ($\Delta P^*$) exceeds a predetermined threshold value.

Preferably, the time limit $\Delta t$ defined for the generation of the above mentioned power control instructions is at most 1 second, more preferably at most 0.5 second, even more preferably at most 0.1 second. Due to the predefined time limit $\Delta t$, in case of the change in the reference signal specified by the production control center, each of the (selected) small power plants can be instructed practically immediately to modify their power in the required direction. When all of the available small power plants are involved in the power control and the power thereof is modified at a maximum rate, the distributed power generation system is capable of reaching the specified power within a few minutes, and in case of using a substantially large number of small power plants, even within 1 minute, also for relatively large steps of the reference signal.

In a particularly preferred embodiment of the method according to the invention, after the distributed power generation system has reached the power specified by the production control center for it, or the control error has decreased below a predetermined threshold value, in a further step at least two small power plants are instructed to further modify its individual power in a predetermined manner to optimize the combined energetic efficiency of the small power plants, while the aggregate power of the distributed power generation system is being kept unchanged. During this process, the individual powers of the selected small power plants are modified towards such power values that have the same relative deviation from the scheduled power values of the respective small power plants. In case any of the small power plants also performs another kind of production, e.g. local production, the total production of the particular small power plant is preferably taken into account for the optimization of its combined energetic efficiency.

Due to the optimization of the production efficiency of the small power plants, those ones with lower energy consumption (or at least a group thereof) will operate at a power higher than the optimal operational range only for a rather short period, and instead of such small power plants, other small power plants with higher local energy consumption will generate the power for the power supply system, thereby they can take part in the production of the required power volume by a production of higher efficiency. As a result, the resultant energetic efficiency of the distributed power generation system using small power plants of various nominal powers may be very high, it may achieve even 80-85%, thus a reduced load on the environment may be maintained, and additionally, the economic indices of the small power plants may also be more favorable.

The method according to the invention is thus suitable not only for increasing the availability of the small power plants, but also for their production efficiency as compared to the prior art solutions. Because of the production characteristics of the small power plants, the increase of the availability would, however, result in a decrease of the production efficiency beyond a certain point. The above mentioned preferred embodiment of the method according to the invention thus allows to appropriately use the available free (production and control) capacities to maximize the resultant energetic efficiency of the system.

In the method according to the invention, the control instructions relating to the change of the power of the small power plants may be generated in several ways. For example, instructions relating to an (absolute or relative) increase or decrease of the power may be sent to the small power plants in order to change the aggregate power to a predetermined extent or to keep it at the same level. Another possible way is to determine, from the control error and the instantaneous power of each small power plant, how large power $P_i^*$ should be generated by the small power plants, and as a control information, the actually determined power values $P_i^*$ are sent to each of the small power plants, that will modify their production in a predetermined manner (for example, at a maximum power changing rate) until they reach the power $P_i^*$ specified for them, or until they receive another instruction, for example an updated value of the power $P_i^*$.

In the method according to the invention, the manner of power control of the small power plants is not limited to the above described techniques, and several other techniques may also be applied that are suitable for carrying out the method of dependant control. All of such control information, data structures, sets of rules and conditions are well known and obvious for a person skilled in the art, thus their details are omitted here.

The invention claimed is:

1. An apparatus (120) for controlling the power generation of a distributed power generation system (100) including a plurality of small power plants (110), characterized in that the apparatus comprises a first communication interface unit (301) configured to receive, from each of the small power plants (110) via a first communication interconnection (311), measured values of the instantaneous power generated by the small power plants (110) in the distributed power generation system (100), and to transmit, through said first communication interconnection (311) to each of the small power plants (110), information relating to the individual power control of the small power plants (110), a second communication interface unit (302) configured to receive, from a production control center (160) via a second communication interconnection (312), power values to be provided by the distributed power generation system for said power supply system, said power values being specified by said production control system as a function of the instantaneous load of the power supply system managed by said production control system, and a central data processing unit (330) configured to determine the aggregate instantaneous power of the distributed power generation system (100) on the basis of the measured power values received from the small power plants (110), to determine the difference between the power specified by the production control center (160) for the distributed power generation system (100) and the aggregate instantaneous power of the distributed power generation system (100), and to generate power control information for each of said small power plants as a function of said power difference, according to a predetermined method.

2. The apparatus according to claim 1, characterized in that the apparatus further comprises a display unit (340) for monitoring the operation of the distributed power generation system (100), and an input device (350) for a partially or entirely manual control of said distributed power generation system.

3. The apparatus according to claim 2, characterized in that the central data processing unit (330) is arranged in a server park (120a), while the display unit (340) and the input device (350) are arranged in a dispatcher station (120b) locating remotely from said server park (120a), wherein a communication interconnection (314) between the server park (120a) and the dispatcher station (120b) is provided by the internet.

4. The apparatus according to claim 1, characterized in that the first communication interconnections (311) are Internet connections.

5. The apparatus according to claim 1, characterized in that the first and second interface units (301, 302) are integrated into a single communication unit (300).

6. A distributed power generation system (100) including a plurality of small power plants (110), each of said small power plants comprising one or more power generation units (200), at least one power measurement unit (210), a power plant control unit (220), a communication network interface unit (230) and a switching unit (250) for coupling to a power distribution network (150), characterized in that the system further comprises a central control apparatus (120) according to claim 1, and a communication network (400) for providing communication interconnections (311) between said control apparatus (120) and each of the small power plants (110).

7. The system according to claim 6, characterized in that the communication network (400) is the Internet.

8. A method for controlling the power generation of a distributed power generation system including a plurality of small power plants, wherein said distributed power generation system produces power for a power supply system managed by a production control center, characterized in that the method comprises the steps of receiving measurement data relating to instantaneous power generated by the small power plants for the distributed power generation system (S600), and determining from said measurement data an aggregate instantaneous power of the distributed power generation system (S610), from said production control center, receiving, at predetermined intervals, a plurality of control reference signal values specifying the power to be produced by the distributed power generation system for said power supply system as a function of the instantaneous load in the power supply system managed by said production control center (S620), determining a difference between the power specified by said production control center for the distributed power generation system and the aggregate instantaneous power of the distributed power generation system (S630), and individually controlling the power of each small power plant within a predetermined time limit so that if the power specified for the distributed power generation system is greater than the aggregate instantaneous power of the distributed power generation system, then instructing at least one small power plant selected from the small power plants having free capacity to increase its power (S640), if the power specified for the distributed power generation system is equal to the aggregate instantaneous power of the distributed power generation system, then keeping the aggregate power of the distributed power generation system unchanged (S650), and if the power specified for the distributed power generation system is smaller than the aggregate instantaneous power of the distributed power generation system, then instructing at least one small power plant selected from said plurality of small power plants to decrease its power (S660).

9. The method according to claim 8, characterized in that step S640 further comprises increasing the power of each one of those small power plants that have free capacity.

10. The method according to claim 8, characterized in that step S640 further comprises increasing the power of the at least one selected small power plant at the highest possible power changing rate.

11. The method according to claim 8, characterized in that step S660 further comprises decreasing the power of each of the small power plants.

12. The method according to claim 8, characterized in that step S660 further comprises decreasing the power of the at least one selected small power plant at the highest possible power changing rate.

13. The method according to claim 8, characterized in that in step S660, the control reference signal values are received from the production control center at intervals of at most 1 minute, preferably at intervals of at most 1 second, and the time limit of the generation of the power control instructions is at most 1 second, preferably at most 0.5 second, more preferably at most 0.1 second.

14. The method according to claim 8, characterized in that when the power of the distributed power generation system has reached the power specified by the production control center for it or has approximated the specified power with a predetermined error, the method further comprises a step of modifying the power of at least two small power plants in a predetermined manner for optimizing the combined energetic efficiency of the small power plants, while keeping the aggregate power of distributed power generation system at the same level.

15. The method according to claim 14, characterized in that the individual powers of the selected small power plants are modified towards such power values that have the same relative deviation from the scheduled power values of the respective small power plants.

* * * * *